United States Patent
Song

(10) Patent No.: US 6,806,935 B2
(45) Date of Patent: Oct. 19, 2004

(54) IN-PLANE SWITCHING MODE LIQUID CRYSTAL DISPLAY DEVICE HAVING COMMON LINES CROSSING GATE LINKS

(75) Inventor: In Duk Song, Kyungsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 89 days.

(21) Appl. No.: 09/887,337

(22) Filed: Jun. 25, 2001

(65) Prior Publication Data

US 2002/0033921 A1 Mar. 21, 2002

(30) Foreign Application Priority Data

Sep. 19, 2000 (KR) .......................................... 2000-55034

(51) Int. Cl.$^7$ ...................... G02F 1/1343; G02F 1/1333
(52) U.S. Cl. ........................................... 349/141; 349/54
(58) Field of Search ........................ 349/54, 141, 192; 345/93

(56) References Cited

U.S. PATENT DOCUMENTS

| | | | | |
|---|---|---|---|---|
| 5,068,748 A | * | 11/1991 | Ukai et al. ..................... | 349/40 |
| 5,497,146 A | * | 3/1996 | Hebiguchi ............... | 340/14.63 |
| 5,598,285 A | | 1/1997 | Kondo et al. ................. | 349/39 |
| 5,668,032 A | * | 9/1997 | Holmberg et al. .......... | 438/149 |
| 5,909,035 A | * | 6/1999 | Kim ............................. | 257/59 |
| 6,335,770 B1 | * | 1/2002 | Komatsu ...................... | 349/38 |
| 6,456,350 B1 | * | 9/2002 | Ashizawa et al. .......... | 349/141 |

OTHER PUBLICATIONS

R. Kieler et al.; "In–Plane Switching of Nematic Liquid Crystals"; Japan Display '92; pp. 547–550.
M. Oh–e, et al.; "Principles and Characteristics of Electro–Optical Behaviour with In–Plane Switching Mode"; Asia Display '95; pp. 557–580.
M. Ohta et al.; "Development of Super–TFT–LCDs with In–Plane Switching Display Mode"; Asia Display '95; pp. 707–710.

S. Matsumoto et al.; Display Characteristics of In–Plane Switching (IPS) LCDs and a Wide–Viewing–Angle 14.5–in. OPS TFT–LCD; Euro Display '96; pp. 445–448.

H. Wakemoto et al.; "An Advanced In–Plane Switching Mode TFT–LCD"; SID 97 Digest; pp. 929–932.

S.H. Lee et al.; High–Transmittance, Wide–Viewing–Angle Nematic Liquid Crystal Display Controlled by Fringe–Field Switching; Asia Display '98; pp. 371–374.

* cited by examiner

Primary Examiner—Tarifur R. Chowdhury
(74) Attorney, Agent, or Firm—McKenna Long & Aldridge LLP

(57) ABSTRACT

A liquid crystal display device that is capable of preventing a deterioration of liquid crystal generated at the outer area of an IPS mode TFT array. In the device, a plurality of data lines apply data signals to a thin film transistor array and a plurality of gate lines apply gate signals to the thin film transistor array. A plurality of gate links is extended from the gate lines into the outer area of the thin film transistor array. A plurality of common voltage lines is provided in such a manner to cross the gate links to apply a common voltage to the thin film transistor array. Accordingly, a deterioration of liquid crystal caused by the gate voltage at the outer area of the TFT array can be prevent to eliminate a generation of stain.

15 Claims, 6 Drawing Sheets

IN-PLANE SWITCHING MODE LIQUID CRYSTAL DISPLAY DEVICE HAVING COMMON LINES CROSSING GATE LINKS

BACKGROUND OF THE INVENTION

This application claims the benefit of Korean Patent Application No. P00-55034, filed on Sep. 19, 2000, which is hereby incorporated by reference for all purposes as if fully set forth herein.

1. Field of the Invention

This invention relates to a liquid crystal display device, and more particularly to a liquid crystal display device that is capable of eliminating a stain generated at an outer area of a thin film transistor array using an in-plane switching mode.

2. Discussion of the Related Art

Generally, a liquid crystal display of active matrix driving system uses thin film transistors (TFTs) as switching devices to display a natural moving picture. Since such a liquid crystal display can be made into a device that is smaller than a cathode ray tube ("CRT"), it is commercially available for use in monitors such as portable televisions, notebook personal computers and laptop personal computers, etc.

The active matrix liquid crystal display (LCD) displays a picture corresponding to video signals, such as television signals, on a pixel (or picture element) matrix having pixels arranged at each crossing of gate lines and data lines. Each pixel includes a liquid crystal cell for controlling transmitted light in accordance with a voltage level of a data signal from a data line. The TFT is installed at the crossing point of the gate line and the data line to switch a data signal to be transferred to the liquid crystal cell in response to a scanning signal (i.e., a gate pulse) from the gate line.

Such a liquid crystal display can be largely classified as twisted nematic (TN) mode, in which a vertical electric field is applied, and an in-plane switching (IPS) mode, in which a horizontal electric field is applied to have a wide viewing angle. How an LCD is classified depends on the direction of an electric field driving the liquid crystal.

The IPS mode LCD has an advantage over the TN mode LCD in that, in an IPS mode LCD, a liquid crystal within a pixel area is rotated in the horizontal direction by a horizontal electric field to have a wide viewing angle.

Referring to FIG. 1, the IPS mode LCD includes a TFT 50 provided at a crossing of a data line 52 and a gate line 54, pixel electrodes 48 arranged in a matrix in a cell area between the data line 52 and the gate line 54, and a common electrode 35 formed in parallel to the pixel electrodes 48 in the pixel area. As shown in FIG. 2, the TFT 50 is provided on a rear substrate 32. The TFT 50 includes a gate electrode 34 connected to the gate line 54, a source electrode 42 connected to the data line 52, a drain electrode 44 connected to the pixel electrode 48, and an active layer 38 defining a channel between the source electrode 42 and the drain electrode 44.

The gate electrode 34, the gate line 54 and the common electrode 35 are formed by depositing a metal such as chrome (Cr), etc. on the rear substrate 32 and then patterning it. Herein, the common electrode 35 is patterned into a plurality of strips within the pixel area. A gate insulating film 36 made from an inorganic dielectric material such as $SiN_x$, etc. is entirely deposited on the rear substrate 32 provided with the gate electrode 34, the gate line 54 and the common electrode 35. Semiconductor layers consisting of the active layer 38 made from amorphous silicon (a-Si) and an ohmic contact layer 40 made from a-Si doped with n+ ions are disposed sequentially on the gate insulating film 36. Then, the source electrode 42, the drain electrode 44 and the data line 52 made from a metal material are provided to cover the semiconductor layers 38 and 40. In this case, the source electrode 42 and the drain electrode 44 are patterned in such a manner to be spaced by a predetermined channel width from each other. Thereafter, indium-tin-oxide (ITO) is deposited and then patterned to form the pixel electrode 48. Herein, the pixel electrode 48 is connected to the drain electrode 44 and is patterned into a plurality of strips that partially overlap and alternate with the common electrode 35 within the pixel area. Subsequently, an ohmic contact layer 40 is etched along a channel defined between the source electrode 42 and the drain electrode 44 to expose the active layer 38. A protective film 46 made from $SiN_x$ or $SiO_x$, etc. is entirely deposited on the rear substrate 32 to cover and thus protect the TFT 50 and the pixel electrode 48.

As shown in FIG. 3, the rear substrate 32, which is provided with the TFT array, is opposed to a front substrate 72, which is provided with black matrices 74 and color filters 76. A liquid crystal layer 78 is interposed between the rear and front substrates 32 and 72. The pixel electrode 48 and the common electrode 35 oppose each other horizontally. When a gate high pulse is applied to the gate electrode 34 of the TFT 50, an electric field corresponding to a difference voltage between a data voltage and a common voltage is applied between the pixel electrode 48 and the common electrode 35. During a scanning period, a channel is defined between the source electrode 42 and the drain electrode 44. Liquid crystal molecules in the liquid crystal layer 78 are driven with the horizontal electric field to control a quantity of transmitted light inputted from a back light.

Referring to FIG. 4, common lines 82 are formed on the rear substrate 32 in parallel to the gate lines 54. The common lines 82 commonly apply a common voltage from an external driver to the common electrode 35 within a TFT array 90. The common voltage lines 82 within the TFT array 90 are formed at an outer area adjacent to the TFT array 90 and are connected, via common voltage pads 80, to the external driver. The gate line 54 is connected, via the gate pad 86 and a gate link 87, to the external driver. The gate link 87, formed at the outer area of the TFT array 90, connects the gate line 54 to the gate pad 86 to deliver a gate voltage from the external driver to the TFT array 90. Further, data pads, data links and data lines (not shown) for delivering a data voltage to the TFT array 90 are provided on the rear substrate 32.

Referring again to FIG. 3, a liquid crystal 78 is injected between the rear substrate 32 and the front substrate 72 over the TFT array area, the gate pad area and the gate link area. In this case, the liquid crystal at the gate pad area and the gate link area is coupled with only a gate voltage applied to the gate link 87, via the gate pad 86 upon driving of the LCD to thereby cause deterioration of the liquid crystal.

More specifically, an electric field corresponding to a voltage difference between a data voltage of the pixel electrode 48 and a common voltage of the common electrode 35 (wherein the pixel electrode 48 is horizontally opposed to the common electrode 35 for each cell) is applied to the liquid crystal 78 of the TFT array 90 when a gate high voltage is applied to the gate electrode 34. Such electric field is maintained during a period when a gate low voltage is applied. By this horizontal electric field, the liquid crystal 78 is driven to control a quantity of a light transmitted from the back light. Generally, a data voltage having the opposite polarity for each successive frame is applied to the liquid crystal 78 to prevent deterioration of the liquid crystal. On the other hand, a gate voltage having the same polarity for each frame is applied to a liquid crystal at the outer area of the TFT array 90, particularly, in the gate link area, for the majority of a frame period. More specifically, a gate high voltage of about +20V is applied to each gate line 54 for a relatively short time during one frame period. A gate low voltage of about −5V is supplied during the remaining portion of the frame period, which is the majority of the frame period. Thus, a gate low voltage having a direct current component is applied to the liquid crystal in the gate link area during the majority of the frame period, thus causing deterioration of the liquid crystal over time. Moreover, liquid crystal deterioration at the gate link area is diffused into the liquid crystal in the vicinity of the edge of the TFT array 90. As a result, a stain is generated at the periphery of the LCD because of such deterioration of the liquid crystal, thus degrading picture quality and reliability.

SUMMARY OF THE INVENTION

Accordingly, the present invention is directed to an in-plane switching mode liquid crystal display device that substantially obviates one or more problems due to the limitations and disadvantages of the related art.

Accordingly, it is an object of the present invention to provide a liquid crystal display device that is capable of preventing deterioration of liquid crystal at the outer area of an IPS mode TFT array.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In order to achieve these and other objects of the invention, an in-plane switching mode liquid crystal display device according to an embodiment of the present invention includes a plurality of data lines for applying data signals to a thin film transistor array; a plurality of gate lines for applying gate signals to the thin film transistor array; a plurality of gate links extended from the plurality of gate lines into the outer area of the thin film transistor array; and a plurality of common voltage lines, being provided in such a manner to cross the plurality of gate links, to apply a common voltage to the thin film transistor array.

These and other objects of the invention will be apparent from the following detailed description of the embodiments of the present invention with reference to the accompanying drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention.

In the drawings.

DETAILED DESCRIPTION OF THE PREFERRED EMBODIMENTS

Reference will now be made in detail to the preferred embodiment of the present invention, example of which is illustrated in the accompanying drawings.

Figure 1:
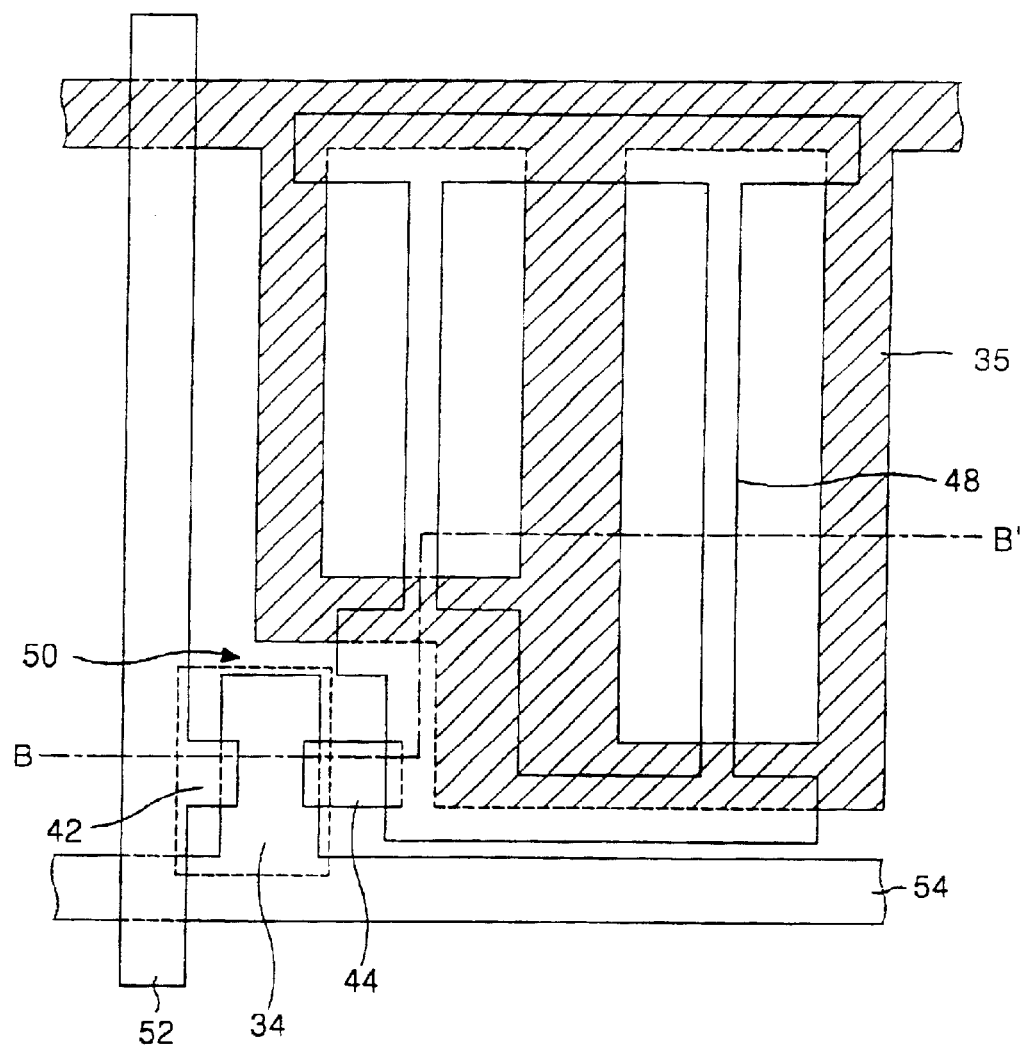
FIG. 1 is a plan view showing a structure of a conventional IPS mode LCD device.
Figure 2:
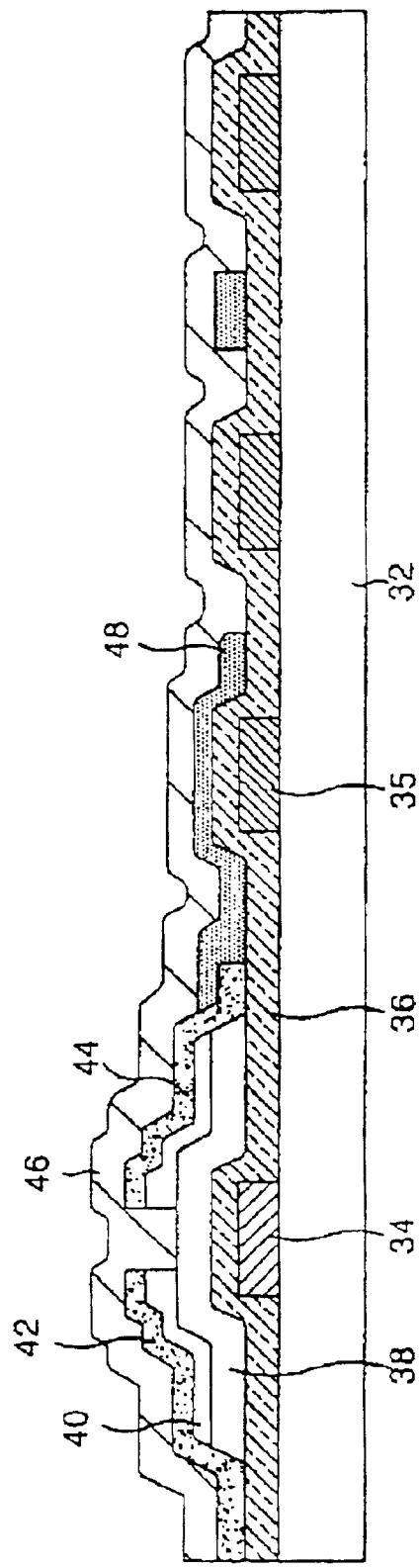
FIG. 2 is a sectional view of the LCD device taken along the B–B' line in FIG. 1.
Figure 3:
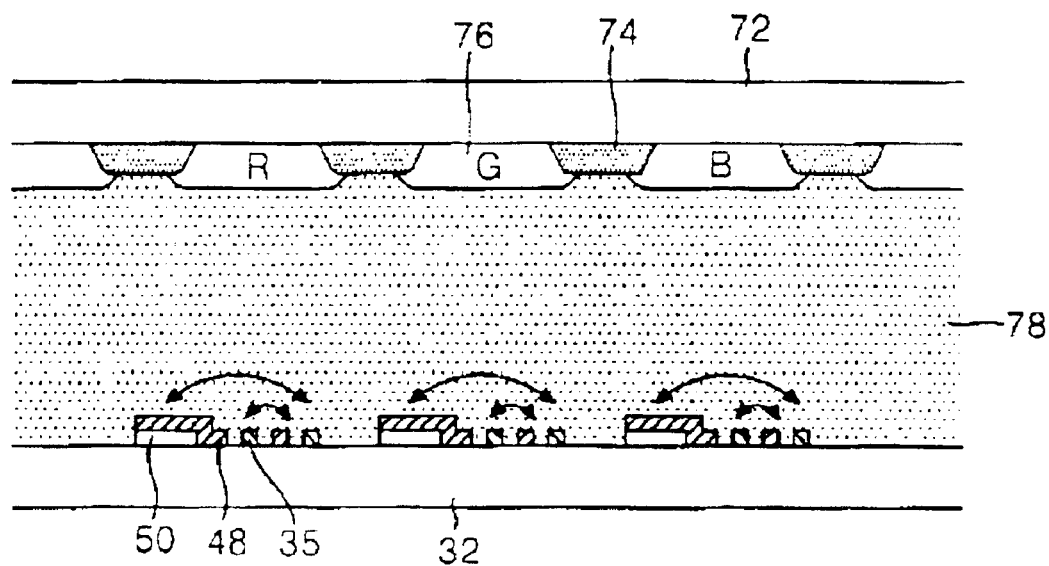
FIG. 3 is a sectional view representing a driving characteristic of the LCD device shown in FIG. 1.
Figure 4:
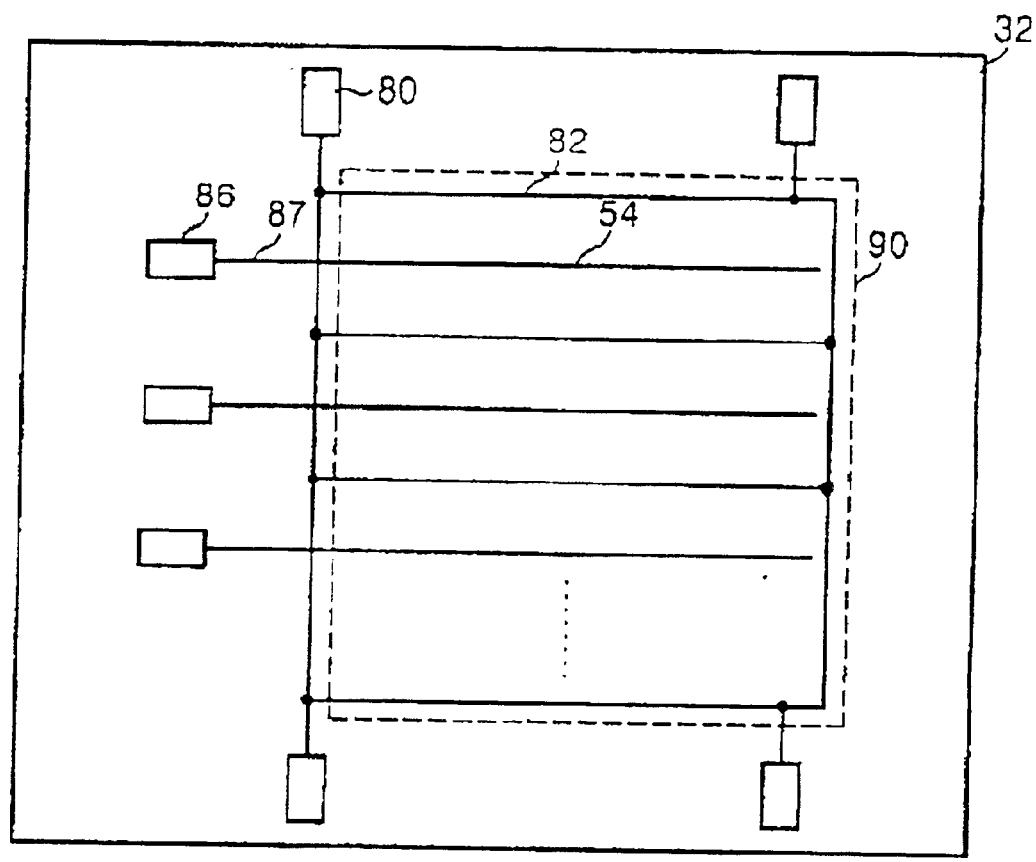
FIG. 4 is a schematic plan view showing an electrode arrangement of the LCD device shown in FIG. 1.
Figure 5:
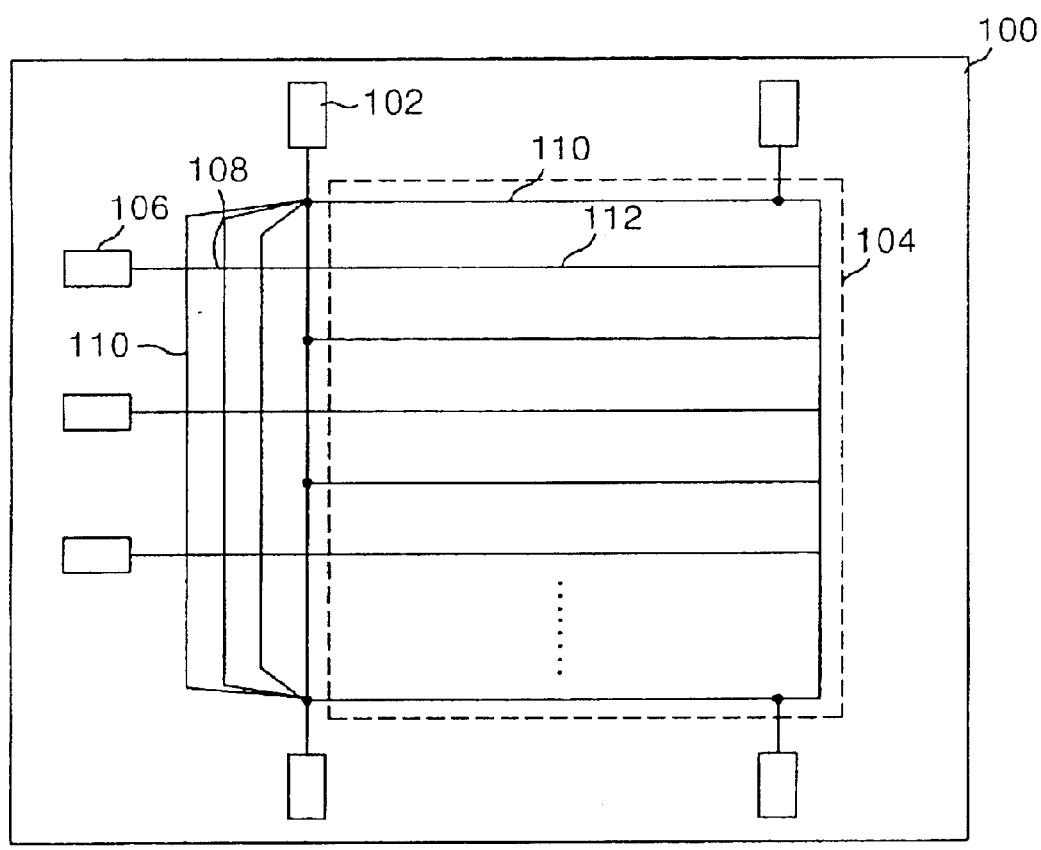
FIG. 5 is a plan view showing an electrode arrangement of a LCD device according to an embodiment of the present invention.

Referring to FIG. 5, there is shown a liquid crystal display (LCD) device according to an embodiment of the present invention. The LCD devices includes a TFT array 104 for displaying a picture on a rear substrate 100, a plurality of common voltage pads 102 and a plurality of common voltage lines 110 for applying a common voltage from an external driver to the TFT array 104, and a plurality of gate pads 106 and a plurality of gate lines 112.

In FIG. 5, the common voltage lines 110 are formed in parallel to the gate lines 112 within the TFT array 104. The common voltage lines 110 within the TFT array 104 are commonly connected by the common voltage lines 110 crossing the gate links 108 at an outer area of the TFT array 104. In particular, a plurality of common voltage lines 110 also is provided at the outer area of the TFT array 104 to apply a common voltage to a liquid crystal at the outer area thereof. Further, the common voltage lines 110 are connected to the external driver via the common voltage pads 102 formed at the outer area of the TFT array 104. The gate pads 106 connected to the external driver are connected to the gate lines 112 within the TFT array 104 via the gate links 108.

Figure 6:
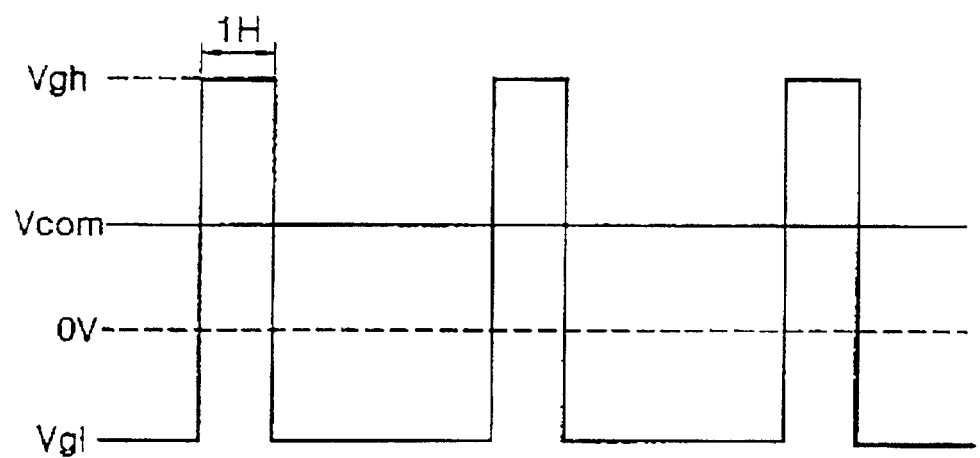
FIG. 6 is a driving waveform diagram of voltages applied to the gate line and the common voltage line shown in FIG. 5.

Gate voltages Vgh and Vgl and a common voltage Vcom having waveforms as shown in FIG. 6 are applied to the TFT array 104. Referring to FIG. 6, a common voltage Vcom of +5V is applied to the common voltage lines 110, while a gate high voltage of about +20V and a gate low voltage Vgl of about −5V are applied to the gate lines 112. The TFTs provided within the TFT array 104 are switched by the gate high voltage applied to the TFT array 104 via the gate pads 106 and the gate links 108 to drive the liquid crystal cells. In this case, the gate low voltage Vgl, which is applied for the majority of the duration period of the gate voltages Vgh and Vgl, is loaded on a liquid crystal at the outer area of the TFT array 104 by the gate links 108 and is distributed and reduced by the common voltage Vcom applied to the common voltage lines 110 crossing the gate links 108. The gate voltage applied to a liquid crystal at the gate link area is distributed by the common voltage lines as mentioned above, so that deterioration of liquid crystal can be prevented.

As described above, according to the present invention, a plurality of common voltage lines is provided at the outer area of the TFT array in such a manner to cross the gate links, thereby allowing a gate voltage loaded on a liquid crystal at the gate link area is distributed and reduced by the common voltage. Accordingly, deterioration of liquid crystal caused by the gate voltage at the outer area of the TFT array can be prevent to eliminate a generation of stain.

It will be apparent to those of skill in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An in-plane switching mode liquid crystal display device comprising:
   a plurality of data lines for applying data signals to a thin film transistor array;
   a plurality of gate lines for applying gate signals to the thin film transistor array;
   a plurality of gate links extended from the plurality of gate lines into an outer area of the thin film transistor array; and
   a plurality of common voltage lines, being provided in such a manner to cross the plurality of gate links, for applying a common voltage to a liquid crystal at the outer area of the thin film transistor array to reduce a gate voltage at the plurality of gate links, wherein the plurality of common voltage lines are arranged parallel to the plurality of gate lines.

2. The in-plane switching liquid crystal display device according to claim 1, wherein the common voltage is approximately +5V.

3. The in-plane switching liquid crystal display device according to claim 1, wherein the gate signals include a gate low voltage signal of approximately −5V.

4. The in-plane switching liquid crystal display device according to claim 1, wherein the gate signals include a gate high voltage signal of approximately +20V.

5. An in-plane switching mode liquid crystal display device, comprising:
   first and second substrates;
   a plurality of data lines;
   a plurality of gate lines perpendicular to the data lines;
   a plurality of thin film transistors at crossing points of the data and gate lines and forming a thin film transistor array on the first substrate;
   a plurality of gate links extended from the plurality of gate lines into an area outside of the thin film transistor array; and
   a plurality of common voltage lines parallel to the gate lines and crossing the gate links, wherein the plurality of common voltage lines are configured to apply a common voltage to a liquid crystal at the area outside the thin film transistor array to reduce a gate voltage at the plurality of gate links.

6. The in-plane switching liquid crystal display device of claim 5, further comprising:
   a plurality of gate pads connected to the gate links and electrically disposed between the gate links and an external power source; and
   a plurality of common voltage pads connected to the common voltage lines and electrically disposed between the common voltage lines and the external power source.

7. The in-plane switching liquid crystal display device of claim 6, wherein the gate pads are located in the area outside of the thin film transistor array.

8. The in-plane switching liquid crystal display device of claim 6, wherein the common voltage pads are located in the area outside of the thin film transistor array.

9. An in-plane switching mode liquid crystal display device comprising:
   a plurality of data lines for applying data signals to a thin film transistor array;
   a plurality of gate lines for applying gate signals to the thin film transistor array;
   a plurality of signal pads in a signal pad area outside the thin film transistor array;
   a plurality of gate links extended from the gate lines; and
   a plurality of common lines extending to cross the plurality of the gate links between the signal pads and the thin film transistor array, wherein the plurality of common lines are configured to apply a common voltage to a liquid crystal at the area outside the thin film transistor array to reduce a gate voltage at the signal pad area, wherein the plurality of common lines are arranged parallel to the plurality of gate lines.

10. The in-plane switching liquid crystal display device of claim 9, wherein the signal pads are gate pads for applying the gate signals to the gate lines.

11. The in-plane switching liquid crystal display device of claim 10, wherein the at least one common line crosses the gate lines in an area between the gate pads and the thin film transistor array.

12. The in-plane switching liquid crystal display device of claim 10, wherein the at least one common line is parallel to the data lines.

13. The in-plane switching liquid crystal display device of claim 9, wherein the signal pads are data pads for applying the data signals to the data lines.

14. The in-plane switching liquid crystal display device of claim 13, wherein the at least one common line crosses the data lines in an area between the data pads and the thin film transistor array.

15. The in-plane switching liquid crystal display device of claim 13, wherein the at least one common line is parallel to the data lines.

* * * * *